Patented Nov. 3, 1942

2,300,955

UNITED STATES PATENT OFFICE 2,300,955

PROCESS FOR THE PRODUCTION OF ADIPIC ACID AND ALKYLADIPIC ACIDS

Gerhard Meier, Leuna, Germany; vested in the Alien Property Custodian

No Drawing. Application March 16, 1940, Serial No. 324,401. In Germany May 6, 1939

2 Claims. (Cl. 260—537)

The present invention relates to a process for the production of adipic acid and alkyladipic acids.

It is known to produce such acids by oxidizing hydrogenated crude cresol with nitric acid and to esterify the resulting mixed acids with alcohols.

I have now found that adipic acid and alkyladipic acids may be obtained in a simple and advantageous manner by oxidizing mixtures of cyclohexanol and its homologues with nitric acid, separating the adipic acid formed from the aqueous acid solution obtained by crystallization, preferably after evaporating part of the water present, and recovering the alkyladipic acids from the mother liquor by evaporation.

As initial materials there may be used, for example, phenol mixtures recovered from waste water which mixture may contain up to 50 per cent of phenol proper. Phenol mixtures derived from the said or any other sources are first freed with advantage from contaminations such as organic sulphur compounds, for example, by passing them together with hydrogen over sulphidic catalysts at temperatures of from 300° to 500° C. under pressures up to 250 atmospheres. The hydrogenation of the phenol mixtures thus purified to produce the corresponding mixtures of cyclohexanol and its homologues may be effected for example with the aid of nickel catalysts. Any cyclohexanes formed in the hydrogenation are preferably removed by distillation. Mixtures of cyclohexanol and its homologues obtained in this or any other way are oxidized to form mixtures of adipic acid and alkyladipic acids by means of strong nitric acid, preferably of from 50 to 65 per cent strength. By cooling the solution which still contains nitric acid, part of the adipic acid separates out provided it is in a sufficient degree of concentration. The remainder of adipic acid may then be obtained by further concentration and crystallization. It is preferable, however, to concentrate the reaction liquor while still hot for example to about half its volume; whereupon from 85 to 95 per cent of the total amount of adipic acid present crystallize out in a fairly pure condition upon cooling. After a single recrystallization from water, it melts at 154° C.

By evaporating the mother liquor, the alkylated adipic acids are obtained as a thick syrup which crystallizes more or less completely after some time. This mixture of alkyladipic acids which contains small amounts (1 to 3 per cent) of succinic and glutaric acid is suitable for use for a variety of industrial applications without further treatment.

The following examples serve to illustrate how the present invention may be carried out in practice, but the invention is not restricted to the said examples. The parts are by weight.

*Example 1*

A mixture of phenols obtained by extracting with tricresylphosphate waste water obtained in a destructive hydrogenation of lignite and containing about 45 per cent of phenol and in addition cresols and xylenols, is passed together with hydrogen over a tungsten sulphide catalyst at 380° C. under a pressure of 100 atmospheres. The resulting purified product is blown with steam for a short time to remove any non-phenolic constituents (preferably by causing it to flow down through a column charged with Raschig rings in countercurrent to steam which method has the advantage that the expenditure of steam is small) and then hydrogenated in the presence of a nickel catalyst at a temperature of 175° C. under a pressure of 10 atmospheres. From the mixture of cyclohexanol and its homologues thus obtained, a small amount of cyclohexanes (i. e. cyclohexane and homologues thereof) is distilled off as first runnings.

85 parts of the distillation residue are slowly added to 400 parts of nitric acid of 50 per cent strength. The acid spontaneously begins to boil and the material is oxidized to adipic acid and its homologues. The solution, while still hot, is concentrated to half its volume and cooled. About 48 parts of adipic acid separate out as a white crystalline mass which, having been once recrystallized, melts at 154° C.

By evaporating the mother liquor there are obtained 57 parts of a mixture of alkyladipic acids containing a small proportion of succinic and glutaric acid as a syrupy mass which solidifies after some days to form a crystalline pulp.

*Example 2*

A mixture of phenols obtained by washing crude benzine with caustic soda solution and containing about 18 per cent of phenol is hydrogenated in the presence of a nickel catalyst under the conditions specified in Example 1.

850 parts of the mixture of cyclohexanol and its homologues, obtained thereby after being freed from any cyclohexane and homologues formed, are oxidized with 4000 parts of nitric acid of 50 per cent strength. The solution obtained, from which no adipic acid separates on cooling, is concentrated to half its volume and cooled. 186 parts of adipic acid are precipitated as a white crystalline mass. After recrystallization it melts at 154° C. By completely evaporating the mother liquor 839 parts of a mixture of alkyladipic acids (containing very small amounts of succinic and glutaric acid) are obtained which form a syrupy mass containing crystals.

What I claim is:

1. In the process for the production of adipic acid and alkyladipic acids by oxidizing a mixture of cyclohexanol and its homologues with nitric acid the step which comprises evaporating the acid aqueous solution obtained in the oxidation to a concentration at which the bulk of the adipic acid formed crystallizes on cooling and recovering the alkyladipic acids from the mother liquor after separating therefrom the adipic acid by further evaporation.

2. In the process for the production of adipic acid and alkyladipic acids by oxidizing a mixture of cyclohexanol and its homologues with nitric acid of from 50 to 65 per cent strength the step which comprises evaporating the aqueous acid solution obtained in the oxidation while still hot to about half its volume, separating the adipic acid by cooling and recovering the alkyladipic acids from the mother liquor by further evaporation.

GERHARD MEIER.